United States Patent Office 3,798,201
Patented Mar. 19, 1974

3,798,201
MOLTEN LEWIS ACID HIGH PERFORMANCE HETEROCYCLIC POLYMER POLYMERIZATION
Lowell Saferstein, Plainfield, and William A. Mannion, Springfield, N.J., assignors to Celanese Corporation, New York, N.Y.
No Drawing. Continuation-in-part of abandoned application Ser. No. 221,779, Jan. 26, 1972. This application Feb. 24, 1972, Ser. No. 229,178
Int. Cl. C08g 20/00
U.S. Cl. 260—78 TF                        9 Claims

ABSTRACT OF THE DISCLOSURE

An improved process is provided for the synthesis of high performance heterocyclic polymers wherein the polymerization is conducted in the presence of a molten Lewis acid selected for its ability to dissolve the high molecular weight polymer and to remove water produced via the condensation reaction.

BACKGROUND OF THE INVENTION

The present invention is a continuation-in-part of co-pending application Ser. No. 221,779, now abandoned, filed Jan. 26, 1972, assigned to the assignee herein.

High performance heterocyclic polymers, i.e., highly aromatic non-melting heterocyclic polymers although useful for the production of flame resistant fibers and films, show limited solubility in all solvents except for certain very concentrated acids such as sulfuric, polyphosphoric, and methane sulfonic acid. The solubility of the polymers in these acids is due, in part, to the protonation of either the heteroatoms present in the polymer, e.g., nitrogen, sulfur, or oxygen atoms or perhaps the aromatic rings themselves. Typical of the manifold problems presented by polymerization processing in these concentrated acid solutions are the following:

(1) Large volumes of acid are required per unit of polymer, i.e., the polymerization must be conducted at low solid levels because of the very high viscosity of the dope solutions;

(2) the above-mentioned high viscosity of the processing dopes makes agitation difficult;

(3) reaction times are very long, i.e., usually in excess of about 18 hours;

(4) the concentrated acids are extremely corrosive; and (5) in addition to initial expense, there exists severe handling, disposal, and/or acid recovery problems.

It is an object of this invention to provide an improved high performance heterocyclic polymer polymerization process whereby a greater conversion of polymer per unit weight of solvent is realized as compared to the concentrated acid synthesis of the prior art and, in addition, to significantly shorten polymerization reaction times.

It is also an object of this invention to simplify the mode of the polymerization by eliminating the heretofore necessarily elaborate precautions to exclude moisture during the polycondensation reactions.

It is an object of this invention to simplify the polymer-solvent separation and recovery process.

It is an object of this invention to simplify the recovery for re-use of the solvent media.

It is also an object of this invention to lessen the severe corrosion problems inherent in the use of concentrated acid solvents.

These and other objects, as well as the scope, nature, and utilization of the invention will be apparent from the following detailed description and appended claims.

SUMMARY OF THE INVENTION

It has been found that certain molten Lewis Acids preferably heavy metal transition element halides, provide ideal media for the synthesis of high performance heterocyclic polymers. The molten Lewis acid is selected for its ability to (1) dissolve the high molecular weight polymer by coordinating with the heteroatoms present in the polymer or with the aromatic rings themselves; (2) remove water produced by the condensation reactions; and (3) be a reasonably low melting Lewis acid such as zinc chloride, tin chloride, bismuth trichloride, aluminum trichloride and antimony trichloride.

DETAILED DESCRIPTION OF THE INVENTION

It has been observed that when high performance heterocyclic polymers are to be synthesized, large volumes of highly concentrated acid have been required for the polymerization media.

This is so because concentrated acids are necessary to dissolve these highly aromatic, non-melting polymers and dopes made from these acids have extremely high viscosities; therefore, in order to maintain viscosity levels at which agitation is realizable, very low solids levels are utilized. Concentrated acids are, of course, extremely corrosive to most construction materials, including glassware, and their use results in attendant polymer adulteration by dissolved container material as well as solvent handling and disposal problems. Also, a significant economic problem exists when highly concentrated acid solvents such as polyphosphoric acid, are sought to be recovered for re-use.

It has now been established that high performance heterocyclic polymers may be synthesized and the above-described problems significantly reduced and/or eliminated by utilizing a molten Lewis acid, in lieu of the highly concentrated acids, as the polymerization medium.

The use of the molten medium serendipitously produces many additional advantages such as significant reduction of reaction times and lower processing temperatures relative to those realized in the synthesis in concentrated acids.

Lewis acids, i.e., substances containing an element which is two electrons short of having a complete valence shell, provide ideal media for synthesizing the high performance heterocyclic polymers of the instant invention for they, like the concentrated acid protons, are electrons pair acceptors and thus coordinate strongly with atoms such as nitrogen, oxygen, or the $\pi$ electrons of the aromatic ring. This coordination is extremely strong between atoms such as nitrogen, oxygen and sulfur with the metallic ions, such as tin, zinc, or antimony, of the heavy metal, transition element molten halides.

The fused Lewis acid selected for the medium of a given polymer synthesis should possess the preferred characteristics of (1) being able to dissolve the high molecular weight polymer which is being formed so that during the polymerization, premature precipitation of the polymer of low molecular weight does not occur; (2) being a chemical dehydrating agent, i.e., capable of absorbing condensation water by either hydrolyzing or forming water of hydration; and (3) being reasonably low melting so that standard materials of construction can be utilized.

The preferred Lewis acids of the instant invention are the heavy metal transition element halides. The more preferred Lewis acids are those halide salts wherein the heavy metal, transition element has a plus two or plus three valence state for they are usually lower melting and more hygroscopic, i.e., usually chemically react with water. Still more preferred of the molten Lewis acids are the plus two and three valent, heavy metal transition element chlorides and non-hydrolizable bromides. The most preferred are the heavy metal, transition element halides selected from the group consisting essentially of antimony trichloride; bismuth trichloride; aluminum trichloride; stannous dichloride; gallium chloride; germanium bromide; germanium chloride; zinc bromide, and zinc chloride.

The high performance heterocyclic polymers contemplated to be produced by the instant invention are those such as polybenzimidazoles; polybenzoxazoles; polybenzothiazoles, aromatic polyimides; aromatic polyoxadiazoles, aromatic polypyrazoles; polyquinozalines; and polyquinoxaline ladder polymers; aromatic polythiadiazoles, aromatic polythiazoles; aromatic polytetrazopyrenes; aromatic poly-4-phenyl-1,2,4-triazoles; poly (quinazolinediones) and poly(benzoxazinones); polyquinone ethers and thioethers; poly(imidazopyrolones) and the poly(benzimidazobenzophenanthrolines).

Polybenzimidazoles which may be synthesized by the instant invention and their preparation are more fully described in the U.S. Pat. No. 2,895,948; U.S. Reissue Pat. No. 26,065; and in the Journal of Polymer Science, vol. 50, pp. 511–539 (1961) which are herein incorporated by reference. The polybenzimidazoles consist essentially of recurring units of the following Formulas I and II. Formula I is:

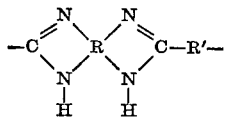

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

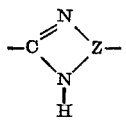

wherein Z is an aromatic nucleus having the nitrogen atoms forming the benzimidazole ring paired upon adjacent carbon atoms of the aromatic nucleus.

Preferably, aromatic polybenzimidazoles are selected, e.g., from polymers consisting essentially of the recurring units of Formulas I and II wherein R' is an aromatic ring or a heterocyclic ring.

As set forth in U.S. Reissue Pat. No. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As also set forth in the above-mentioned patent, the aromatic polybenzimidazoles having the recurring units of Formula I may be prepared by condensing an aromatic tetraamine compound containing a pair of ortho-diamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene and pyran and (c) an anhydride of an aromatic dicarboxylic acid.

The aromatic tetraamines may be represented by the general formula:

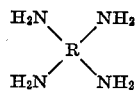

wherein R is aromatic and each amino group of said tetraamine is attached directly to a carbon atom of the aromatic nucleus and is in ortho or peri relationship to another of the directly attached amino groups.

The R aromatic may be any mono or poly nuclear aromatic such as phenylene, naphthalene, biphenylene and the like. More particularly, it may be a mono or polynuclear aromatic such as

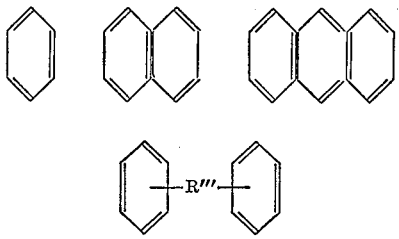

or

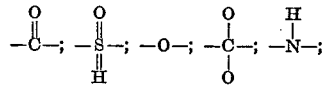

wherein R''' can be an aliphatic group containing from one to six, and preferably from one to three, carbon atoms; an aromatic group; e.g., phenylene;

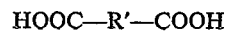

a covalent bond; or the like.

Preferably, R''' is a covalent bond or —O—, and is para to an amino group on each aromatic nucleus. The R and R''' groups may also contain inert substituents, i.e., substituents which do not interfere with the polymerization reaction in the system.

Non-limiting examples of suitable specific aromatic tetraamnes which may be used in the present invention are 3,3' diamino benzidine; bis(3,4-diamino phenyl) methane; 1,2-bis(3,4-diamino phenyl)ethane; 2,2'-bis(3,4-diamino phenyl) propane; bis(3,4-diamino phenyl) sulfide; bis(3,4-diamino phenyl) sulfone; 1,4,5,8-tetraamino naphthalene; bis(3,4-diamino phenyl)ether; 2,3,6,7-tetraaminonaphthalene and the corresponding ring hydrogenated tetraamines.

The preferred aromatic tetraamines are 3,3'-diaminobenzidine and bis(3,4-diamino phenyl)ether.

The manner in which the aromatic tetraamine is prepared is well known and does not form a part of the present invention.

Non-limiting examples of anhydrides and aliphatic and aromatic diesters of aromatic dicarboxylic acids include the anhydrides, alkyl esters having from one to twelve carbon atoms in the alkyl group and diphenyl esters corresponding to isophthalic acid, terephthalic acid, naphthalene 1,4-dicarboxylic acid, naphthalene 1,6-dicarboxylic acid, naphthalene 2,6-dicarboxylic acid, bibenzoic acid, 4,4'-biphenyl dicarboxylic acid, diphenyl ether 4,4'-dicarboxylic acid, and diphenyl methane 4,4'-dicarboxylic acid.

Non-limiting examples of suitable diphenyl esters of heterocyclic dicarboxylic acids include the diphenyl esters corresponding to pyridine 2,5-dicarboxylic acid, pyridine 2,6 dicarboxylic acid, pyridine 3,5-dicarboxylic acid, pyrazine 2,5-dicarboxylic acid, furan 2,5-dicarboxylic acid and quinoline 2,6-dicarboxylic acid.

Further, aliphatic dicarboxylic acids may be used. The use of these aliphatic dicarboxylic acids, however, may lessen the thermal stability of the copolymer.

The aliphatic dicarboxylic acids may be represented by the general formula:

HOOC—R'—COOH wherein R' is a divalent aliphatic hydrocarbon radical, and preferably an aliphatic hydrocarbon radical consisting of methylene groups.

Particularly useful dicarboxylic acids are those wherein the number of methylene groups varies from 4 to 8.

Non-limiting examples of suitable specific aliphatic dicarboxylic acids which may be used in the present invention are sebacic and adipic acids.

Examples of polybenzimidazoles which have the recurring structure of Formula I are as follows:

poly-2,2'-(m-phenylene)-5,5'-bibenzimidazole;
poly-2,2'(pyridylene-3'',5''')-5-5'-bibenzimidazole;
poly-2,2'(furylene-2'',5'')-5-5'-bibenzimidazole;
poly-2,2'-(naphthalene-1'',6'')-5,5'-bibenzimidazole;
poly-2,2'(biphenylene-4'',4'')-5,5'-bibenzimidazole;
poly-2,2'-amylene-5,5'-bibenzimidazole;
poly-2,2'-octamethylene-5,5'-bibenzimidazole;
poly-2,6(m-phenylene)-diimidazobenzene;
poly-2,2'-cyclohexeneyl-5,5'-bibenzimidazole;
poly-2,2'(m-phenylene)-5,5'-di(benzimidazole)ether;
poly-2,2'(m-phenylenes)5-5'-di(benzimidazole)sulfide;
poly-2,2'(m-phenylene)-5,5'-di-(benzimidazole)sulfone;
poly-2',2'-(m-phenylene)-5,5'-di(benzimidazole) methane;
poly-2',2''(m-phenylene)-5',5''-di(benzimidazole)- propane-2,2; and
poly-2',2''(m-phenylene)-5',5''-di(benzimidazole)- ethylene-1,2 where the double bonds of the ethylene groups are intact in the final polymer.

Polybenzoxazoles which may be synthesized by the method of the instant invention include those prepared by reacting dicarboxylic compounds such as aforedescribed with a diaminodihydroxy aromatic compound having each of the hydroxy groups in ortho or peri relationship to one of the amino groups.

The diaminodihydroxy aromatic compounds may be represented by the general formula:

$$\begin{array}{c} H_2N \quad NH_2 \\ \diagdown R \diagup \\ \diagup \quad \diagdown \\ HO \quad OH \end{array}$$

wherein R has the meaning given above in the tetraamine description and each amino and/or hydroxy group of said compound is attached directly to a carbon atom of the aromatic nucleus and each hydroxy group is in ortho or peri relationship to one of the directly attached amino groups.

R''' is preferably a covalent bond, and is preferably para to the amino group or para to the hydroxy group on each aromatic nucleus.

Non-limiting examples of suitable specific diaminodihydroxy compounds which may be used in the present invention are 3,3'-diamino, 4,4'-dihydroxy-biphenyl; 3,3'-dihydroxy,- 4,4'-diamino-biphenyl; 3,3'-dihydroxy 4,4'-diamino diphenyloxide; 3,3'-dihydroxy, 4,4'-diamino diphenylsulfone; 2,2'-bis(3-amino - 4 - hydroxy-phenyl) propane; bis(3-hydroxy 4-aminophenyl)methane; 3,3' - dihydroxy-4,4'-diamino benzophenone; 1,1-bis(3-hydroxy-4 - aminophenyl)ethane; 1,3-bis(hydroxy-4-amino-phenyl)propane; and 2,2'-bis(3-hydroxy-4-aminophenyl)propane.

The manner in which the diaminohydroxy aromatic compound is prepared is not a part of the present invention and is well known.

Polybenzothiazoles which may be synthesized by the method of the instant invention include those prepared by reacting dicarboxylic compounds such as aforedescribed with a diaminodimercapto aromatic compound having each of the mercapto groups in ortho or peri relationships of one of the amino groups.

The diamino-dimercapto aromatic compounds may be represented by the general formula:

$$\begin{array}{c} HS \quad SH \\ \diagdown R \diagup \\ \diagup \quad \diagdown \\ H_2N \quad NH_2 \end{array}$$

wherein R has the meaning given above in the tetraamine description and each amino and/or mercapto group of said compound is attached directly to a carbon atom of the aromatic nucleus and each mercapto group in ortho or peri relationship to one of the directly attached amino groups.

R''' is preferably a covalent bond and is preferably para to the amino group or para to the mercapto group on each aromatic nucleus.

Non-limiting examples of suitable specific diamino dimercapto compounds which may be used in the present invention are those prepared by the reaction of 3,3'-diamino-4,4' dimercapto biphenyl with isophthalic acid; with pyridine-3,5 - dicarboxylic acid; 4,4' oxydibenzoic acid; 4,4'-Ketodibenzoic acid; and 3-amino-4-mercapto benzoic acid.

Polyamic acid polymers which may be synthesized by the method of the instant invention include those prepared by the reaction of an organic diamine with an aromatic dianhydride.

Illustrative of the aromatic diamines which may be used in the present invention are those which may be depicted by the following general formula:

$$\begin{array}{c} H \quad H \\ | \quad | \\ H-N-Y-N-H, \end{array}$$

wherein Y is $-C_6H_4-$, $-C_{10}H_6-$, $-C_{14}H_8-$, $-C_6H_4-C_6H_4-$, $-C_6H_4-R-C_6H_4-$ wherein R is as defined below, and the like. Y may be substituted with groups which do not detrimentally interfere with the reaction.

Illustrative subcategories of the diamines which may be used are:

(I) Compounds of the general formula:

$$\begin{array}{c} H \quad H \\ | \quad | \\ H-N-Z-N-H, \end{array}$$

wherein Z is $-C_6H_4-$, $-C_{10}H_6-$, $-C_{14}H_8-$;

(II) Compounds of the general formula:

$$\begin{array}{c} H \quad H \\ | \quad | \\ H-N-C_6H_4-C_6H_4N-H \end{array}$$

(III) Compounds of the general formula:

$$\begin{array}{c} H \quad H \\ | \quad | \\ H-N-C_6H_4-R-C_6H_4N-H \end{array}$$

wherein R may be $-CH_2-$, $-\overset{O}{\underset{\|}{C}}-$, $-\overset{O}{\underset{\|}{S}}-$, $-\overset{O}{\underset{\underset{O}{\|}}{\overset{\|}{S}}}-$, $-\overset{CH_3}{\underset{CH_3}{\overset{|}{C}}}-$, $-S-$, $-O-$, $-\overset{H}{\underset{}{N}}-$, $-CH_2-\langle S \rangle-CH_2-$, $\langle S \rangle$, $-\overset{CH_3}{\underset{CH_3}{\overset{|}{Si}}}-$, $-\overset{C_2H_5}{\underset{C_2H_5}{\overset{|}{Si}}}-$, $-\overset{C_2H_5}{\underset{C_6H_5}{\overset{|}{Si}}}-$, or the like.

Illustrative of particular aromatic diamines which may be used in the process of this invention are the following:

m-phenylene diamine
p-phenylene diamine
O-phenylene diamine
1,4-naphthalene diamine
1,5-naphthalene diamine
1,6-naphthalene diamine
1,7-naphthalene diamine 1,8-naphthalene diamine
2,3-naphthalene diamine
2,6-naphthalene diamine
2,7-naphthalene diamine
1,4-diamino-2-methyl-naphthalene
1,4-diamino anthracene
2,6-diamino anthracene
9,10-diamino-anthracene
9,10-diamino-phenanthrene
2,2'-diamino-biphenyl
3,3'-diamino-biphenyl
3,4'-diamino-biphenyl
4,4'-diamino-biphenyl
4,4'-diamino-2,2'-dimethyl-biphenyl
1,1-bis(4-aminophenyl)cyclohexane
bis(4-aminophenyl)dimethyl silane
bis(4-aminophenyl)diethyl silane
bis(4-aminophenyl)diphenyl silane
bis(4-aminophenyl)amine
bis(4-aminophenyl) ether, i.e., 4,4'-diamino diphenyl ether
bis(4-aminophenyl)thioether
2,2-bis(4-aminophenyl)propane
bis(4-aminophenyl)sulfone
bis(4-aminophenyl)sulfoxide
bis(4-aminophenyl) ketone
bis(4-aminophenyl)methane By the term "aromatic diamine" is meant a compound in which the two amino groups are each attached to an aromatic ring, not necessarily both attached to the same ring, however. Generally, any aromatic diamine containing up to about 30 carbon atoms can be used in the present invention. Preferably, the diamine contains up to about 20 carbon atoms, most preferably up to about 15 carbon atoms. The most preferred diamines are benzidine and oxydianiline.

Suitable aromatic dianhydrides are those derived from the tetracarboxylic acids of the general formula:

$$\begin{array}{c} \text{HOOC} \quad \text{COOH} \\ \diagdown \diagup \\ R^3 \\ \diagup \diagdown \\ \text{HOOC} \quad \text{COOH} \end{array}$$

where $R^3$ is a tetravalent organic radical, e.g., aromatic aliphatic, cycloaliphatic, heterocyclic, combination of aromatic and aliphatic, or substituted groups thereof. Illustrative are the following:

wherein $R^4$ is alkylene of 1–3 carbon atoms, oxygen, sulfur, or one of the following:

$$-SO-, \ -\overset{O}{\underset{\|}{C}}-, \ -\overset{O}{\underset{\|}{C}}-O, \ -\overset{O}{\underset{\|}{C}}-\overset{H}{\underset{|}{N}}, \ -\overset{O}{\underset{\|}{C}}-\overset{R^5}{\underset{|}{N}}-, \ -\overset{}{\underset{R^5}{\underset{|}{N}}}-$$

$$-\overset{R^5}{\underset{\underset{R^5}{|}}{\overset{|}{Si}}}-, \ -O-\overset{R^5}{\underset{\underset{R^5}{|}}{\overset{|}{Si}}}-O, \ -\overset{R^5}{\underset{\underset{O}{\|}}{\overset{|}{P}}}- \ \text{and} \ -O-\overset{R^5}{\underset{\underset{O}{\|}}{\overset{|}{P}}}-O-$$

wherein $R^5$ is alkyl or aryl, and/or substituted groups thereof.

In these acids every carbonyl group above is attached directly to a separate carbon atom of the aromatic radical, the carbonyl groups being in pairs, the groups of each pair being adjacent to each other. Adjacent means ortho or peri, so that the dicarboxylanhydro rings are 5- or 6- membered, respectively.

The preferred acids are the aromatic tetracarboxylic acids, those in which the $R^3$ groups have at least one ring of 6 carbon atoms characterized by benzenoid unsaturation (alternate double bounds in a ring structure), and particularly those aromatic acids wherein the 4 carbonyl groups of the acid are each attached to separate carbon atoms in a benzene ring and wherein the carbon atoms of each pair of carbonyl groups is directly attached to adjacent carbon atoms in a benzene ring of the $R^3$ group.

Illustrative of acids are the following:
pyromellitic acid
2,3,6,7-naphthalene tetracarboxylic acid
3,3',4,4'-diphenyl tetracarboxylic acid
1,2,5,6-naphthalene tetracarboxylic acid
2,2'-3,3'-diphenyl tetracarboxylic acid
2,2-bis(3,4-dicarboxyphenyl)propane
bis(3,4-dicarboxyphenyl)sulfone
3,4,9,10-perylene tetracarboxylic acid
bis(3,4-dicarboxyphenyl)ether
ethylene tetracarboxylic acid
naphthalene-1,2,4,5-tetracarboxylic acid
naphthalene-1,4,5,8-tetracarboxylic acid
decahydronaphthalene-1,4,5,8-tetracarboxylic acid
4,8-dimethyl-1,2,3,5,6,7-hexahydronaphthalene-1,2,5,6-tetracarboxylic acid
2,6-dichloronaphthalene-1,4,5,8-tetracarboxylic acid
2,3,6,7-tetrachloronaphthalene-1,4,5,8-tetracarboxylic acid
phenanthrene-1,8,9,10-tetracarboxylic acid
cyclopentane-1,2,3,4-tetracarboxylic acid
pyrrolidine-2,3,4,5-tetracarboxylic acid
pyrazine-2,3,5,6-tetracarboxylic acid
2,2-bis(2,3-dicarboxyphenyl)propane
1,1-bis(2,3-dicarboxyphenyl)ethane
1,1-bis(3,4-dicarboxyphenyl)ethane
bis(2,3-dicarboxyphenyl)methane
bis(3,4-dicarboxyphenyl)methane
bis(3,4-dicarboxyphenyl)sulfone
benzene-1,2,3,4-tetracarboxylic acid
1,2,3,4-butane tetracarboxylic acid
thiophene-2,3,4,5-tetracarboxylic acid
3,4,3',4'-benzophenone tetracarboxylic acid
2,3,2',3'-benzophenone tetracarboxylic acid
2,3,3',4'-benzophenone tetracarboxylic acid Of course, homopolymers of polyamic acids can be synthesized via 4-amino-phthalic anhydride; 3-amino naphthalic anhydride; and 4-amino naphthalic anhydride.

Suitable polyimides which may be produced via the medium of the instant invention include those derived from the dehydration of the above-described polyamic acid polymers.

Illustrative of the poly oxadiazoles which may be prepared by the instant invention are those which may be depicted by the general formula:

I $$\left[ -R_1-\underset{N-----O}{\overset{N}{\overset{\diagup\diagdown}{C}}}C-R_2-\underset{O-----N}{\overset{N}{\overset{\diagup\diagdown}{C}}}C- \right]_x$$

and II $$\left[ -R_1-\underset{N-----N}{\overset{O}{\overset{\diagup\diagdown}{C}}}C-R_2-\underset{N-----N}{\overset{O}{\overset{\diagup\diagdown}{C}}}C- \right]_x$$

wherein $R_1$ and $R_2$ are
$-C_6H_4-$; $-C_{10}H_6-$; $-C_{14}H_8-$; $-C_6H_4-C_6H_4-$;
$-C_6H_4-R-C_6H_4-$;

wherein R may be

—CH$_2$—, —C(=O)—, —S—, —S(=O)$_2$—, —C(CH$_3$)$_2$—, —S—, —O—, —N(H)—,

—CH$_2$—⟨S⟩—CH$_2$—, ⟨S⟩, —Si(CH$_3$)$_2$—, —Si(C$_2$H$_5$)$_2$—, —Si(C$_6$H$_5$)$_2$—, or the like.

Illustrative of the particular poly-1,2,4-oxydiazoles which may be prepared by the instant process are those wherein R$_1$ is 1,3 phenylene and R$_2$ is 1,4 phenylene; both R$_1$ and R$_2$ are 1,3 phenylene; and wherein both R$_1$ and R$_2$ are 1,4-phenylene.

Poly-thiadiazole polymers may also be prepared via the instant process. Suitable polymers are illustrated by the sulfur anologs of the above described oxydiazoles.

Typical of the polypyrazoles which may be prepared via the instant process are those synthesized by the reaction of 1,6-bis(diazo) hexane with 1,4-diethynylbenzene; 1,6-bis (diazo) hexane with diacetylene; 1,4-bis(diazo) xylene with 1,4-(diethynylbenzene); 1,3-dihydrazinobenzene with 1,2,2,2-tetra acetylethanol and p-bis(diazo) benzene with p-diethylnylbenzene.

With the instant invention, polyquinoxalines may be prepared by the reaction of tetracarbonyl compounds such as 1,4-diglyoxalbenzene with aromatic tetraamine compounds heretofore described to yield polymers, specific examples of which are the following:

poly-2,2'-(1,4-phenylene)-6,6'-diquinoxaline
poly-2,2'-(1,4-phenylene)-6,6'-oxydiquinoxaline
poly-2,2'-(1,3-phenylene)-6,6'-diquinoxaline
poly-2,2'-(1,3-phenylene)-6,6'-oxydiquinoxaline
poly-2,2'-(4,4'-oxydiphenylene)-6,6'-diquinoxaline
poly-2,2'-(4,4'-oxydiphenylene)-6,6'-oxydiquinoxaline Other high performance heretocyclic polymers which may be prepared by the instant invention are the aromatic polythiazoles and polydithiazoles illustrated by the general formula:

$$\left[ -R_1-C(=N)-C(-S-)=C-R_2-C(=N)-C(-S-)=CH- \right]_x$$

wherein R, may be 1,4-tetramethylene
1,4-phenylene
1,3-phenylene
1,4-cyclohexylene
4,4'-biphenylene
bis(4-phenylene)methane
bis(4-phenylene)ether
2,6-pyridylene and R$_2$ may be 1,4-phenylene and
bis-(4-phenylene)ether Polytetraazopyrenes having the general formula:

$$\left[ -C(=N)-\text{(pyrene)}-C(=N)-R- \right]_x$$

wherein R may be an isophthalic, terephthalic, 2,6-naphthalenic, or oxybisbenzoic nucleus may also be prepared by the instant invention.

Illustrative of specific phenylene triazole polymers which may be synthesized via the instant process are the following:

poly(m-phenylene)-4-phenyltriazole
poly(m,p-phenylene)-4-phenyltriazole
poly[(1,3-phenylene), (2,6-naphthalene)]-4-phenyltriazole
poly[(1,3-phenylene), (4,4'-biphenyl)]-4-phenyltriazole Poly(quinazolenediones) and poly(benzoxazinones) can also be produced by the cyclopolycondensation reaction of 4,4-diamino-biphenyl-3,3-dicarboxylic acid with aromatic diisocyanate and aromatic dicarboxylic acid compounds respectively.

The production of ladder polymers such as the polyquinone ethers and thioethers from the reaciton of chloranil with tetrahydroxy-1,4-benzoquinone, and various sulfides respectively is also contemplated in the present invention as is the synthesis of polyquinoxaline polymer via a 4-fluoro-3-nitroanilene polycondensation for example.

Of especial interest is the poly(imidazopyrrolones) wherein the acid groups were in the peri positions on the aromatic rings and the polypyrrones wherein the acid groups were in the ortho positions on the aromatic rings which may be synthesized via the instant process. These polymers are prepared by the reaction of aromatic dianhydrides wiht an aromatic tetraamine. Such dianhydrides and tetraamines as has been previously described are suitable reaction monomers. The most preferred polymer class that can be prepared via the molten Lewis Acid media of the instant invention are the poly(benzimidazobenzophenanthrolines), i.e., the BBB polymers. These polymers differ from the previously discussed poly(imidazopyrrolones) only in the presence of the fused six-membered cyclic diimide structures. These polymers are made by condensing at least one organic tetraamine with at least one tetracarboxylic acid (which also may be in the form of the corresponding dianhydride).

Illustrative of the organic tetra-amines that may be used in the BBB preparation are those depcited by the general formula $$\begin{array}{c} NH_2 \\ | \\ NH_2-R-NH_2 \\ | \\ NH_2 \end{array}$$

wherein R is an aromatic or cycloaliphatic tetravalent radical and wherein each of the four amino groups is attached directly to a carbon atom present in a ring of said aromatic or cycloaliphatic radical in a position which is ortho or peri to another carbon atom to which another of said amino groups is also directly attached. When R is an amino substituted bicyclic ring compound, such as a tetra-amino substituted naphthalene, the carbon atoms at the 1 and 8 positions are considered to be peri to each other as are the carbon atoms at the 4 and 5 positions. Five or six member rings are formed depending upon whether R is ortho or peri amino substituted respectively, as will be apparent to those skilled in the art. It is preferred that R be an aromatic radical rather than a cycloaliphatic radical. It is preferred that R contain up to about 20 carbon atoms.

Non-limiting examples of the tetra-amine monomers which may be used individually or in mutual admixture in forming the desired polymers are: 3,3'-diaminobenzidine; bis(3,4 - diaminophenyl) methane; 1,2 - bis(3,4-diamino phenyl)ethane; 2,2-bis(3,4-diamino phenyl) propane; bis (3,4-diamino phenyl)ether; bis(3,4-diamino phenyl) sulfide; bis(3,4-diamino phenyl) sulfone; 1,4,5,8-tetra-aminonaphthalene; 2,3,6,7-tetra-aminonaphthalene; etc.; and the corresponding ring-hydrogenated tetra-amines.

Illustrative of the tetracarboxylic acids (which also may be in the form of the corresponding dianhydride) which may be used to prepare the BBB polymers which may be synthesized via the instant invention are those which may be depicted by the following structural formula:

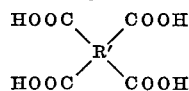

wherein R' is a tetravalent aromatic or cycloaliphatic radical wherein each of the four carboxyl groups is attached directly to a carbon atom present in a ring of said aromatic or cycloaliphatic radical in a position which is ortho or peri to another carbon atom to which another of said carboxyl groups is also directly attached. When R' is a carboxyl substituted bicyclic fused ring compound, such as a tetra-carboxyl substituted naphthalene the carbon atoms at the 1 and 8 positions are considered to be peri to each other, as are the carbon atoms at the 4 and 6 positions. Five or six member rings are formed depending upon whether R' is ortho or peri carboxyl substituted respectively, as will be apparent to those skilled in the art. It is preferred that R' be an aromatic radical rather than a cycloaliphatic radical. It is preferred that R contained up to about 20 carbon atoms.

Non-limiting examples of the tetracarboxylic acids are depicted under the polyamic acid description as well as the dianhydrides of such acids. The preferred tetracarboxylic acids contain carboxyl, i.e., acid groups peri substituted upon a naphthalene nucleus. Of course, homopolymers can be synthesized when the amino groups and the carboxylic acid groups of the anhydride moiety are on the same aromatic ring structure.

The temperature range within which the polymerizations of the instant invention can take place should be from at least a temperature at which the Lewis acid becomes molten up to but not exceeding the boiling point at the operating pressure of said acid or the decomposition temperatures of the monomers, polymer, or solvent.

EXAMPLE I

This example illustrates a typical prior art preparation of the high performance polymer poly(bisbenzimidazo-benzo-phenanthroline) in polyphosphoric acid.

Equimolar quantities of 1,4,5,8-naphthalene tetracarboxylic acid and 3,3'-diamino benzidine are added to a closed reaction vessel provided with a central stirrer. The reactants while at room temperature are filled with a nitrogen atmosphere and degassed three times through the use of a vacuum pump. Subsequent to degassing air is excluded from the interior of the reaction vessel by a flow of nitrogen.

Polyphosphoric acid having an $H_3PO_4$ concentration of 107.4 percent by weight and of 78 percent by weight expressed as $P_2O_5$ is selected as the polymerization medium. The polyphosphoric acid polymerization medium is formed from commercially available polyphosphoric acid having an $H_3PO_4$ concentration of 115 percent by weight by dilution with water. The polyphosphoric acid is heated to 100° C. and a vacuum is applied to the same to remove air. The polyphosphoric acid is cooled to below 80° C. and incrementally added to the reaction vessel with moderate stirring over a period of 15 minutes in a total quantity equivalent to 24 kg. of the polyphosphoric acid per mole of the reactants to form a thick slurry. The 3,3'-diamino benzidine largely dissolves while the 1,4,5,8-naphthalene tetracarboxylic acid remains as a solid in the slurry.

When the introduction of the polyphosphoric acid is begun, heat is applied to the reaction vessel. After approximately 30 minutes the contents of the reaction vessel reaches 100° C. The stirring speed is then set at 150 r.p.m. The reaction vessel is maintained at 100° C. for approximately 1 hour and 30 minutes to insure adequate admixture of the reactants, and then the temperature of the reaction vessel is progressively raised at a rate of 12.5° C. per hour. After 7.2 hours a temperature of 190° C. is achieved, and this temperature is maintained for 11.2 hours during which time the bulk of the polymerization occurs. The poly(bisbenzimidazo-benzophenanthroline) formed consists of several different isomers one of which may be identified as poly(6,9 - dihydro-6,9-dioxobisbenzimidazo(2,1-b): 1',2'-j)benzo(1mn)(3,8)phenanthroline-2,13-diyl].

The contents of the reaction vessel are next poured into a separate vessel provided with a central agitator containing a copious quantity of deionized water to precipitate the polymer as a particulate fibrous solid capable of passing a sieve of approximately 10 mesh. The temperature of the water is raised to the boiling point, and the deionized water is replaced several times to produce water washed polymer having an I.V. of 3.34.

The particulate bulk polymer is removed from the deionized water by filtration, and is placed in a vessel provided with a central agitator containing a copious quantity of a 0.125 N aqueous sodium hydroxide solution. Approximately 6 moles of sodium hydroxide are provided per each mole of repeating polymer unit, and the particulate polymer is present as a freely flowing slurry. The aqueous sodium hydroxide solution is maintained at the boiling point (100° C.) for 1 hour after which time the I.V. of the polymer assumes a relatively constant value of 2.34.

The resulting polymer is recovered by filtration, washed by placement in boiling deionized water with agitation for 1 hour, recovered by filtration, acidified with hot aqueous hydrochloric acid at 100° C. for 1 hour, recovered by filtration and again washed with deionized water at 100° C. The polymer is next dried to constant weight in a vacuum oven at 140° C.

EXAMPLE II

As illustrated in Example I, in the typical preparation of high performance polymers in polyphosphoric acid, the reactions is "worked-up" by adding the polymerized reaction mixture to water, thereby precipitating the polymer and converting the polyphosphoric acid into phosphoric acid. The polymer is then filtered and the filtrate of phosphoric acid is reconstituted back to polyphosphoric acid for reuse.

This is usually accomplished by first distilling the water until a concentration of 85% phosphoric acid is obtained and thus to this aqueous solution of phosphoric acid is added sufficient phosphorous pentoxide to yield a final concentration of phosphoric acid of about 110%.

EXAMPLE III

The simplicity of the almost total recovery for reuse of a typical molten Lewis Acid of this instant invention is illustrated by the following using antimony trichloride as an example:

During the polymerization of polybenzimidazole-benzophenanthrolene of (BBB) in antimony trichloride four moles of water are liberated per mole of polymer produced. These four moles of water in turn react with four moles of $SbCl_3$ to generate four moles of antimony oxychloride (CbOCl) and eight moles of HCl gas. On a mass basis 2.08 pounds of $SbCl_3$ are converted to SbOCl per pound of polymer generated.

The $SbCl_3$ is dissolved in methylene chloride and the solution placed in a vacuum oven. The methylene chloride (B.P.=40.1 C.) will vaporize off at about 45–50° C. The temperature is increased to about 200° C. and a mild vacuum applied which will (1) volatilize the $SbCl_3$ and (2) disproportionate the SbOCl to $SbCl_3$ and $Sb_2O_3$, with the refractory oxide remaining in the vaporizor along with the bulk of the anticipated impurities. The $Sb_2O_3$ (about 5% of the original $SbCl_3$) is collected and either disposed of or rechlorinated.

EXAMPLE IV 73.8 grams of naphthalene tetracarboxylic acid (TCN) and 52.00 grams of diaminobenzidine (DAB) are added to 2,400 grams of antimony trichloride in a 2-liter resin kettle equipped with a nitrogen sweep inlet and outlet. The kettle is continuously swept by nitrogen and heated with an oil bath. At approximately 100° C. (oil bath) the contents of the kettle melts and a downward spiraling stirrer is inserted and allowed to slowly stir the solution. The oil bath is heated to 170° C. and is held there for 16 hours. At the end of 16 hours, the kettle contains a thick pourable, homogeneous dope. The polymer is precipitated into methylene chloride which dissolves the antimony trichloride and antimony oxychloride. The polymer is filtered off, and the methylene chloride is boiled off from the rest of the filtrate to collect the antomny trichloride and antimony oxychloride which is reconstituted back to $SbCl_3$. The bis-benzimidazobenzophenanthroline polymer (BBB) has an I.V. of about 2.40 dl./g. as measured at 0.4 percent concentration in about 97 percent $H_2SO_4$ at 25° C.—the standard method for these polymers.

EXAMPLES V–IX

It has also been discovered that, in the polymerization of BBB as illustrated in Example IV, the dianhydride of naphthalene tetracarboxylic acid (TCNA) could be substituted for TCN with equal effectiveness. This represents a considerable advantage over using TCN which is harder to purify due to its tendency to ring close to the dianhydride during drying. In addition, less water is liberated during the condensation reaction when TCNA is used, thus lessening the extent of hydrolysis of antimony trichloride to antimony oxychloride.

The following table illustrates further BBB polymerization reactions in antimony chloride.

| Example | Starting material | Reaction time, hrs. | Temp., °C. | Solids level, percent | I.V., dl./g. |
|---|---|---|---|---|---|
| V | TCN, DAB | 4 | 150 | 10 | 1.13 |
| VI | TCNA, DAB | 8 | 170 | 7 | 2.70 |
| VII | TCNA, DAB | 15 | 170 | 3 | 3.52 |
| VIII | TCNA, DAB | 5 | 170 | 7.5 | 2.23 |
| IX | TCNA, DAB | 16 | 170 | 4 | 2.4 |

EXAMPLE X

Equimolar quantities of TCNA and DAB are mixed with sufficient Bismuth Trichloride to yield a 4.8% level of polymer in the $BiCl_3$ in the reactor of Example IV. The reaction melt is held at 250° C. for approximately 3¾ hours. The polymer solution is allowed to cool to room temperature; slurried overnight in hot methanol; and then filtered and slurried in 3N–HCl for 18 hours. The BBB has an I.V. of about 2.25 dl./g.

EXAMPLE XI 2.48 grams (0.01 mole) of 3,3'-diamino-4,4'-dimercapto biphenyl and 1.66 grams (0.01 mole) of isophthalic acid are mixed in 40 grams of bismuth trichloride and heated with stirring under $N_2$ at 250° C. for 15 hours. The solution darkens and thickens during the polymerization. The solution is allowed to cool to 80° C.; poured into chloroform; and stirred vigorously. The polymer precipitates from the solution as the bismuth trichloride dissolves in the chloroform. The yellow polymer is filtered and dried. A polybenzothiazole with an I.V. of 0.41 dl./g. in concentrated $H_2SO_4$ is obtained.

EXAMPLE XII 0.01 mole of p-phenylene diisocyanate and 0.01 mole of 4,4'-diamino-biphenyl 3,3'-dicarboxylic acid are mixed in 50 grams of antimony trichloride. The mixture is heated at 175° C. for 10 hours. The solution is then added to dichloroethane and the polymer precipitated. A polyquinazolinedione, identified by its infra-red structure, is recovered with an I.V. of about 0.48 dl./g. in concentrated $H_2SO_4$.

EXAMPLE XIII 3,3' diamino benzidine and the diphenyl ester of 2,5-carboxylic acid react in molten antimony trichloride to yield a polybenzimidazole.

EXAMPLE XIV 3,3'-diamino, 4,4'-dihydroxy-biphenyl and the diphenyl ester of 2,5-carboxylic acid react in molten antimony trichloride to yield a polybenzoxazole.

EXAMPLE XV m-Phenylene diamine and 2,3,6,7 - naphthalene tetracarboxylic acid react in molten antimony trichloride to yield a polyamic acid which upon dehydration yields a polyimide.

EXAMPLE XVI polycondensation of 4-fluoro-3-nitroaniline in zinc chlohexane with 1,4-diethynylbenzene in molten aluminum trichloride.

EXAMPLE XVII

A polyquinoxaline is prepared by the reaction of 1,4-diglyoxalbenzene with 3,3'-diamino benzidine in stannous dichloride.

EXAMPLE XVIII

A polyquinoxaline polymer can be prepared by the polycondensation of 4-fluoro-3-nitroanilene in zinc chloride.

From the above illustrated examples it can be readily seen that the instant invention discloses an improved polymerization process for high performance polymers wherein:

(1) the reaction times can be significantly shortened;

(2) elaborate procedures to exclude moisture need not be utilized;

(3) the polymer-solvent separation and recovery process are simplified;

(4) the severe corrosion problems associated with the highly concentrated acid solvents of the prior art are lessened; and (5) a greater conversion of polymer per unit weight of solvent is possible as compared to the concentrated acid syntheses of the prior art.

As this invention may be embodied in several forms without departing from the spirit or essential character thereof, the present embodiments are illustrative and not restrictive. The scope of the invention is defined by the appended claims rather than by the descriptions preceding them and all embodiments which fall within the meaning and range of equivalency of the claims are, therefore, intended to be embraced by these claims.

What is claimed is:

1. In a process for synthesizing poly(benzimidazobenzphenanthrolines) from tetracarboxylic acid or derivatives thereof and tetra-amine reactants by heat reacting said reactants, the improvement which comprises:
   forming said polymers in a molten solvent selected from aluminum halides and heavy metal transition element halides.

2. The process of claim 1 wherein the heavy metal transition element has a +2 valence state.

3. The process of claim 1 wherein the heavy metal transition element has a +3 valence state.

4. The process of claim 1 wherein the heavy metal transition element halide is a heavy metal transition element chloride.

5. The process of claim 1 wherein the heavy metal transition element halide is a non-hydrolyzable bromide.

6. The process of claim 1 wherein the aluminum halide is aluminum trichloride.

7. The process of claim 1 wherein the heavy metal transition element halide is selected from the group consisting of antimony trichloride, bismuth trichloride, stannous dichloride, gallium chloride, germanium bromide, germanium chloride, zinc bromide, and zinc chloride.

8. The process of claim 1 wherein the tetraamine is selected from 3,3'-diaminobenzidine, bis(3,4-diamino phenyl)methane, 1,2-bis(3,4-diamino phenyl) ethane, 2,2-bis(3,4-diamino phenyl) propane, bis(3,4-diamino phenyl) ether, bis(3,4-diamino phenyl) sulfide, bis(3,4-diamino phenyl) sulfone, 1,4,5,8-tetraamino-naphthalene, 2,3,6,7-tetra-aminonaphthalene and their corresponding ring-hydrogenated tetra-amines, and wherein the tetracarboxylic acid is selected from naphthalene tetracarboxylic acid, pyromellitic acid, and their anhydrides.

9. The process of claim 8 wherein the heavy metal transition element halide is selected from the group consisting of antimony trichloride, bismuth trichloride, stannous dichloride, gallium chloride, germanium bromide, germanium chloride, zinc bromide, and zinc chloride.

References Cited

UNITED STATES PATENTS 3,574,170   4/1971   Chenevey _____ 260—78

OTHER REFERENCES

Gibbs, William E., Chem. Absts., 70: 29933n (1969).
Masterton and Slowinski, Chemical Principles, 2nd ed. (1969), W. B. Saunders Company, pp. 451–3.

MELVIN GOLDSTEIN, Primary Examiner

W. C. DANISON, Assistant Examiner

U.S. Cl. X.R.

260—2 R, 47 R, 65, 78.4 R and E, 79, 93.5 R, 94.1